(12) United States Patent
Hong et al.

(10) Patent No.: US 6,759,025 B2
(45) Date of Patent: Jul. 6, 2004

(54) METHOD OF SYNTHESIZING CARBON NANOTUBES AND APPARATUS USED FOR THE SAME

(75) Inventors: Eun-Hwa Hong, Pohang (KR); Kun-Hong Lee, Pohang (KR); Chang-Mo Ryu, Kyungsangbuk-do (KR); Jong-Hoon Han, Seoul (KR); Jae-Eun Yoo, Seoul (KR)

(73) Assignees: Iljin Nanotech Co., Ltd. (KR); Pohang University of Science and Technology Foundation (KR)

( * ) Notice: Subject to any disclaimer, the term of this patent is extended or adjusted under 35 U.S.C. 154(b) by 115 days.

(21) Appl. No.: 09/842,714

(22) Filed: Apr. 27, 2001

(65) Prior Publication Data

US 2002/0127170 A1 Sep. 12, 2002

(30) Foreign Application Priority Data

Sep. 22, 2000 (KR) .......................... 2000-55829

(51) Int. Cl.$^7$ ................................. D01F 9/12
(52) U.S. Cl. ................. 423/447.3; 423/447.1; 423/445 R
(58) Field of Search .................. 423/447.1, 445 B, 423/445 R, 447.3

(56) References Cited

U.S. PATENT DOCUMENTS 5,165,909 A * 11/1992 Tennent et al. .......... 423/447.3
6,045,769 A * 4/2000 Kambe et al. ........... 423/447.3
6,423,288 B2 * 7/2002 Mandeville et al. ..... 423/447.3
2002/0004028 A1 * 1/2002 Margrave et al. ........ 423/447.3

FOREIGN PATENT DOCUMENTS

JP        11-116218       4/1999
WO        01/23303 A      4/2001

OTHER PUBLICATIONS

L.C. Qin et al., "Growing Carbon Nanotubes By Microwave Plasma–Enhanced Chemical Vapor Deposition" Applied Physics Letters, American Institute of Physics, New York, US, vol. 72, No. 26, Jun. 29, 1998, pp. 3437–3439.

M. Nath et al., "Production of Bundles of Aligned Carbon and Carbon–nitrogen Nanotubes by the Pyrolysis of Precursors on Silica–supported Iron and Cobalt Catalysts," Chemical Physics Letters, May 26, 2000, vol. 322, No. 5, pp. 333–340.

* cited by examiner

Primary Examiner—Stuart L. Hendrickson
Assistant Examiner—Peter J Lish
(74) Attorney, Agent, or Firm—Burns Doane Swecker & Mathis, LLP (57) ABSTRACT

A method of synthesizing carbon nanotubes and a carbon nanotube synthesizing apparatus used for the same are provided. A catalyst is introduced into the reactor, and the catalyst in the reactor is selectively and locally heated by a heating method such as microwave irradiation, electromagnetic inductive heating, radio frequency heating or laser heating. Here, carbon source gas, carbon source gas and hydrogen sulfide gas, or carbon source gas and hydrogen gas or inert gas is supplied into the reactor, thereby growing carbon nanotubes from the locally heated catalyst.

11 Claims, 8 Drawing Sheets

METHOD OF SYNTHESIZING CARBON NANOTUBES AND APPARATUS USED FOR THE SAME

BACKGROUND OF THE INVENTION

1. Field of the Invention

The present invention relates to synthesizing carbon nanotubes, and more particularly, to a method of synthesizing carbon nanotubes through local heating and an apparatus used for the same.

2. Description of the Related Art

It is known that a carbon nanotube is microscopically constituted such that a single carbon element is combined with three neighboring carbon atoms, a hexagonal ring is formed by the combination among the carbon atoms, and a plane composed of repeated hexagonal rings like a honeycomb is rolled to thereby form a cylindrical shape. The carbon nanotube is characterized by the diameter being usually several angstroms through several tens of nanometers, and the length being several tens through several thousands of times longer than the diameter. It is known that such a carbon nanotube has both metal property and semiconductive property, thereby having excellent physical and electrical properties. Accordingly, the carbon nanotube has been widely applied to a variety of fields using its conductivity and/or semiconductivity.

Conventionally, carbon nanotubes are synthesized by a method such as arc discharge method, a laser evaporation method, a thermal chemical vapor deposition (CVD) method, a catalytic synthesizing method or a plasma synthesizing method. These methods are performed at a high temperature of several hundreds through several thousands of degrees centigrade or under a vacuum to release the high temperature condition.

Moreover, in these conventional methods, an entire reactor is heated to meet a reaction temperature for synthesizing carbon nanotubes. Here, all substances such as reactant gases and a catalyst which are supplied into the reactor are heated. Accordingly, when a catalyst is loaded on a support or a substrate, the support or the substrate should be formed of a heat-resistant material which can tolerate a high reaction temperature as described above. In other words, selection of a support or a substrate for loading a catalyst is restricted.

SUMMARY OF THE INVENTION

To solve the above problems, it is a first feature of the present invention to provide a method of synthesizing carbon nanotubes, which allows a support or a substrate for loading a catalyst not to be heated to a high temperature by locally heating the catalyst.

It is a second feature of the present invention to provide a carbon nanotube synthesizing apparatus used for performing the above method.

Accordingly, to achieve the first feature of the invention, there is provided a method of synthesizing carbon nanotubes. In the method, a catalyst is introduced in a reactor, a reactant gas containing a carbon source gas is supplied over the catalyst, the catalyst in the reactor is locally and selectively heated, and carbon nanotubes are grown from the heated catalyst.

The local heating of the catalyst can be achieved by irradiation of microwaves, electromagnetic inductive heating, laser heating or radio frequency heating.

To achieve the second feature of the invention, there is provided an apparatus for synthesizing carbon nanotubes. The apparatus includes a reactor for receiving a catalyst, a reactant gas supplier for supplying a reactant gas containing carbon source gas into the reactor, and a local heater for selectively heating the catalyst received in the reactor.

The apparatus may also include a catalyst gas supplier for supplying the catalyst into the reactor in gas phase.

The local heater may include a microwave generator for generating microwaves, and a microwave guide connected to the reactor, the microwave guide guiding the microwaves to the reactor. The local heater may include a high-frequency coil installed around the reactor, and a power supply for applying high-frequency current to the high-frequency coil. The local heater may include a radio frequency generator installed near the reactor. The local heater may include a laser beam generator installed near the reactor, and a lens for focusing laser beams generated by the laser beam generator.

According to the present invention, carbon nanotubes can be synthesized under the condition of lower temperature, that is, in a state where the entire reactor is maintained at a low temperature, through local heating. Therefore, a substrate or a support for loading a catalyst thereon can be formed of polymer material or glass.

BRIEF DESCRIPTION OF THE DRAWINGS

The above features and advantages of the present invention will become more apparent by describing in detail a preferred embodiment thereof with reference to the attached drawings in which:

FIG. 13 is a schematic diagram illustrating an example of a carbon nanotube synthesizing apparatus suitable for an inductive heating method used in the embodiment of the present invention;

FIG. 14 is a schematic diagram illustrating an example of a carbon nanotube synthesizing apparatus suitable for a laser heating method used in the embodiment of the present invention; and FIG. 15 is a schematic diagram illustrating an example of a carbon nanotube synthesizing apparatus suitable for a radio frequency heating method used in the embodiment of the present invention.

DETAILED DESCRIPTION OF THE PRESENT INVENTION

Hereinafter, an embodiment of the present invention will be described in detail with reference to the attached drawings. The present invention is not restricted to the following embodiments, and many variations are possible within the sprit and scope of the present invention. The embodiment of the present invention is provided in order to more completely explain the present invention to anyone skilled in the art. In the drawings, the shapes of members are exaggerated for clarity and the same reference numerals denote the same members.

Figure 1:
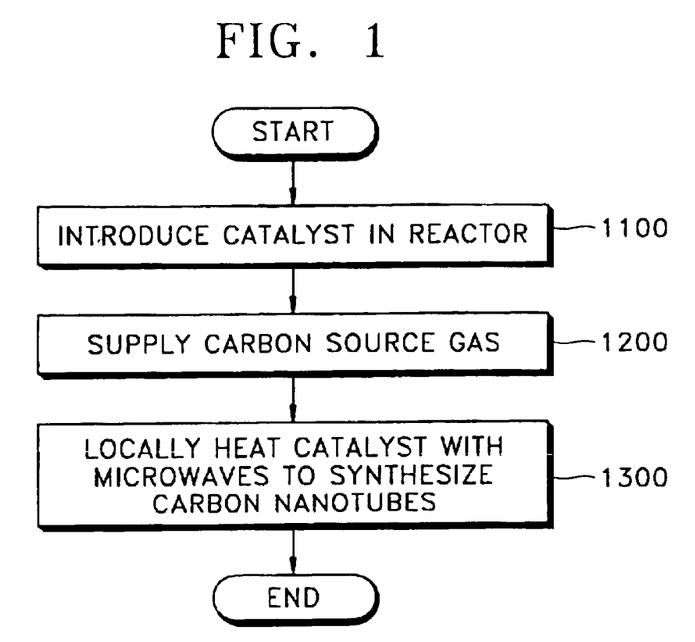
FIG. 1 is a schematic flowchart illustrating a method of synthesizing carbon nanotubes according to an embodiment of the present invention.
Figure 6:
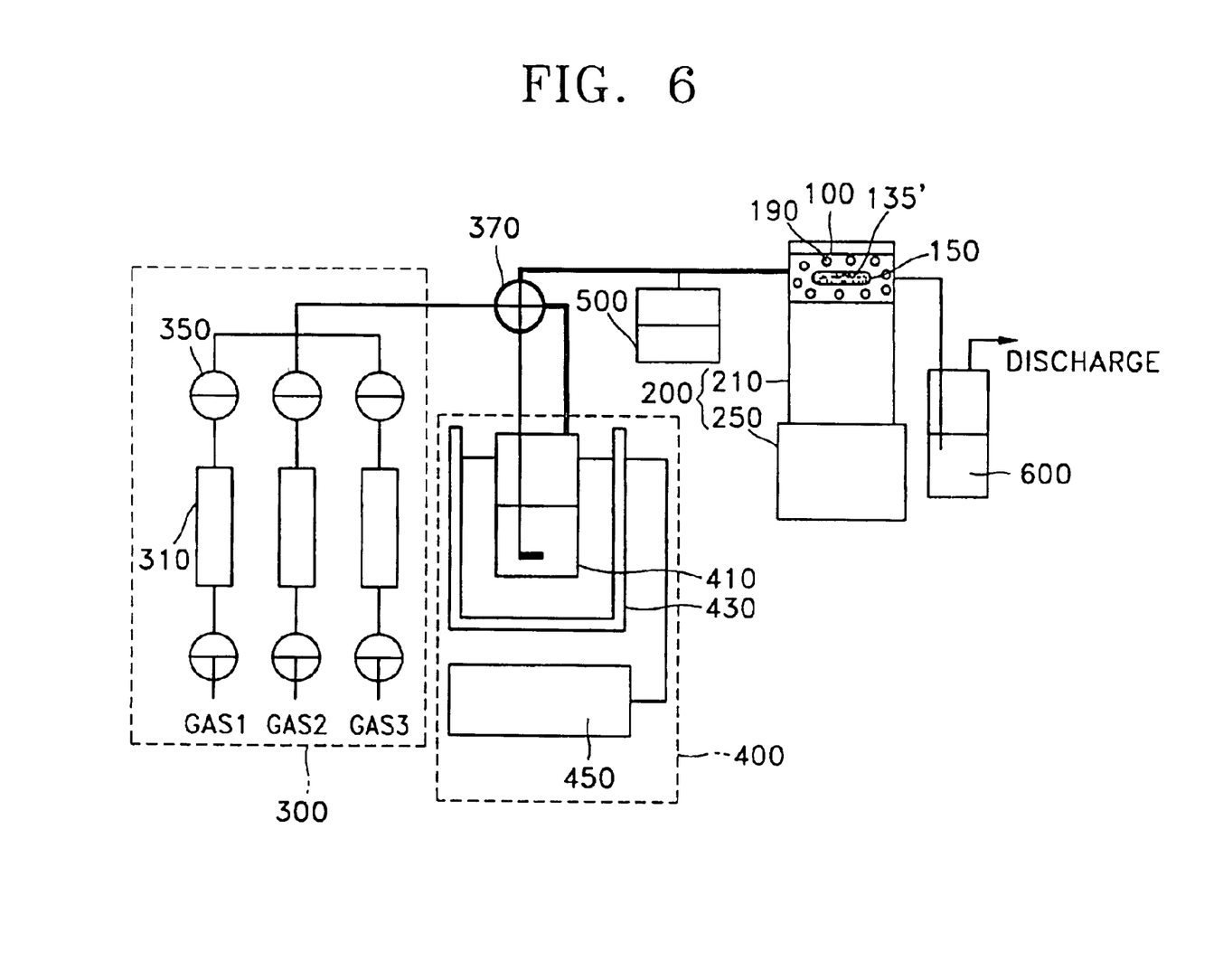
FIG. 6 is a schematic diagram illustrating an example of a carbon nanotube synthesizing apparatus having a microwave generator, which is used in the embodiment of the present invention.

Referring to FIG. 1, a method of synthesizing carbon nanotubes according to an embodiment of the present invention can be performed using a carbon nanotube synthesizing apparatus as shown in FIG. 6. The carbon nanotube synthesizing apparatus of FIG. 6 is suggested as a means for realizing the conception of local heating proposed by the embodiment of the present invention.

Figure 2:
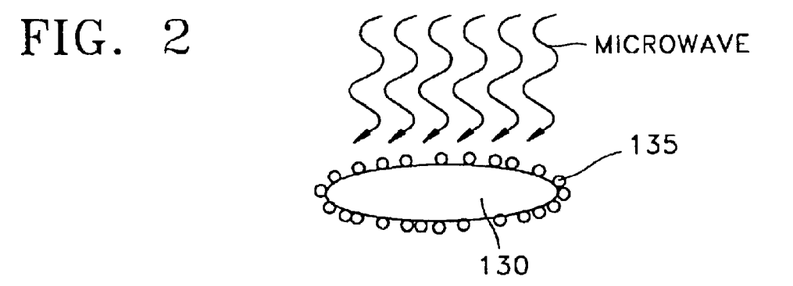
FIGS. 2 and 3 are schematic cross-sectional views illustrating a method of locally heating a catalyst according to the embodiment of the present invention.
Figure 3:
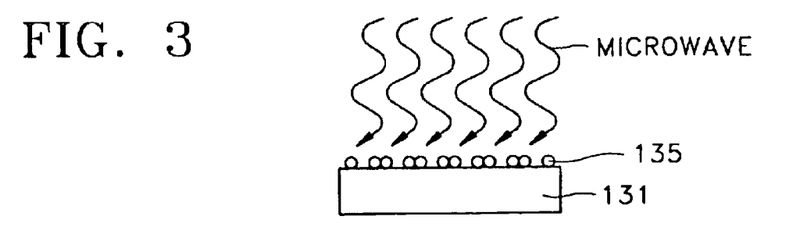

Referring to FIGS. 2, 3 and 6, the carbon nanotube synthesizing apparatus of FIG. 6 includes a reactor 100 for receiving a boat 150 which loads with catalyst powder 135' or a substrate 131 which loads with a catalyst 135. The catalytic powder 135' is manufactured by loading a catalyst 135 of FIG. 2 formed of, for example, a transition metal on a support 130. The reactor 100 can be realized as a quartz tube.

The reactor 100 is provided with a local heater 200 for supplying microwaves to locally heat the catalyst powder 135', substantially, the catalyst 135. The local heater 200 may include a microwave generator 250 for generating microwaves and a microwave guide 210 for guiding the microwaves to the reactor 100.

In addition, a reactant gas supplier 300 for supplying a reactant gas used for synthesizing carbon nanotubes and a discharger 600 for discharging a gas after reaction are installed to the reactor 100. The reactant gas supplier 300 may include gas bombes for supplying a carbon source gas such as hydrocarbon or hydrogen sulfide ($H_2S$), or supplying hydrogen gas ($H_2$) or an inert gas which can be supplied together with the carbon source gas and mass flow controllers (MFCs) and on/off valves 350 which are installed to ducts between the gas bombes and the reactor 100 for controlling a gas flow rate. A plurality of sets of the bombe, MFC 310 and the on/off valve 350 may be provided.

The catalyst 135 may be supplied in such a form of loading a transition metal or the precursor of a transition metal on the support 130 or the substrate 131, as shown in FIGS. 2 and 3, but it may be supplied in gas phase at need. When using the precursor of a metal such as iron (Fe), nickel (Ni) or cobalt (Co), for example, ferrocene ($FeC_{10}H_{10}$) or iron pentacarbonyl ($Fe(CO)_5$) as a catalyst supplied in gas phase, such a precursor, which mostly exits in a liquid or solid state, needs to be vaporized in order to be supplied to the reactor 100.

To meet this necessity, a catalytic gas supplier 400 may be additionally installed to the reactor 100. The catalytic gas supplier 400 includes a saturator 410 for vaporizing a solid or liquid catalyst or a catalyst precursor, a water bath 430 for accommodating the saturator 410 and a circulator 450 for controlling the temperature of water in the water bath 430 and circulating the water. A gaseous catalyst generated by the saturator 410 is supplied into the reactor 100 via a duct and acts as a catalyst in the reactor 100.

Here, a four-port 370 is provided at the intersection of the ducts connected to the reactant gas supplier 300 and the catalytic gas supplier 400, respectively, for inducing the flow of a gas. When supplying a catalyst in gas phase, a temperature controller 500 may be provided for maintaining the catalyst in gas phase. The temperature controller 500 includes a slidax and a temperature readout unit. The temperature controller 500 measures the internal temperature of the reactor 100 using a thermocouple and the like, reads out the measured result and maintains the internal temperature such that a catalyst can be injected into the reactor 100 in gas phase.

A method of synthesizing carbon nanotubes using such a carbon nanotube synthesizing apparatus as described above will be described with reference to the flowchart of FIG. 1. In step 1100, a catalyst 135 of FIG. 2 or 3 is introduced in the reactor 100, as shown in FIG. 6. Here, the catalyst 135 may be manufactured by loading a transition metal or the precursor of a transition metal on the powder type support 130, as shown in FIG. 2, or on the substrate 131, as shown in FIG. 3. The catalyst powder 135' manufactured by loading the catalyst 135 on the powder type support 130 may be put on the boat 150 and the like and introduced in the reactor 100. Alternatively, when the catalyst 135 is loaded on the substrate 131, the substrate 131 may be introduced in the reactor 100.

For the catalyst 135, a transition metal such as iron, nickel or cobalt or a compound containing the transition metal, for example, metal sulfide such as cobalt sulfide, iron sulfide or nickel sulfide, metal carbide containing the transition metal, metal oxide, metal nitrate or metal sulfate, can be used. Besides, an organic compound such as cobalt naphtenate containing the transition metal described above can be used as the catalyst 135.

The catalyst 135 is manufactured by loading the precursor of a transition metal containing iron, nickel or cobalt on the support 130 of FIG. 2 using an impregnation method, an incipient wetness method or an ion-exchange method. Thus-manufactured catalyst 135 may be dried and used in the form of the catalyst powder 135' or may be used after undergoing reduction and calcination or sulfiding and carbonization to make the catalyst 135 have a variety properties.

The support 130 or the substrate 131 may be formed of a material such as silicon oxide ($SiO_2$) or aluminum oxide ($Al_2O_3$) which is not heated by microwaves. Alternatively, the powder type support 130 formed of carbon (C) which can be heated by microwaves and the like may be used. The catalyst 135 loaded on the support 130 may be put on the boat 150 of FIG. 6 and introduced in the reactor 100 in a powder state. Alternatively, the catalyst 135 may be loaded on the substrate 131 using deposition, spraying or painting. After the loading, the catalyst 135 may be used after being just dried or after undergoing reduction and calcination or sulfiding and carbonization.

A method of loading the catalyst 135 on the support 130 will be described below with reference to examples.

TEST EXAMPLE 1

Fe of 5 wt % is impregnated into the support 130 of carbon by dissolving a Fe-precursor such as $Fe(NO_3)_3 9H_2O$ in distilled water. The resultant thing is dried at about 110° C. for about 24 hours and then reduced at about 500° C. for 3 hours in a hydrogen atmosphere, thereby obtaining the catalyst powder 135' of Fe (5 wt %)/C, as shown in FIG. 2. It is apparent that other various methods can be used for loading the catalyst 135 on the support 130 or the substrate 131.

The catalyst 135 loaded on the support 130 or the substrate 131 is put on the boat 150 and introduced in the reactor 100, and then the reactor 100 is filled with a heat-resistant material such as quartz wool 190 to block heat transmission from the inside to the outside. Thereafter, in step 1200 of FIG. 1, a reactant gas is supplied into the reactor 100. The reactant gas preferably contains a carbon source gas.

In step 1300, the catalyst 135 is locally heated by irradiating microwaves on the reactor 100 accommodating the catalyst 135 or the catalyst powder 135'. Since the catalyst 135 is formed of a material which can be dielectrically heated by microwaves, the catalyst 135 is heated by microwaves applied thereto, as shown in FIG. 2 or 3. The microwaves can be generated with 2.45 GHz and 800 W power.

Such heating can be selectively restricted to the catalyst 135 such that the reactant gas, the support 130, the substrate 131 or the boat 150 supplied into the reactor 100 are not heated. Accordingly, the support 130, the boat 150 or the substrate 131 may be formed of glass or polymer material such as plastic.

Figure 4:
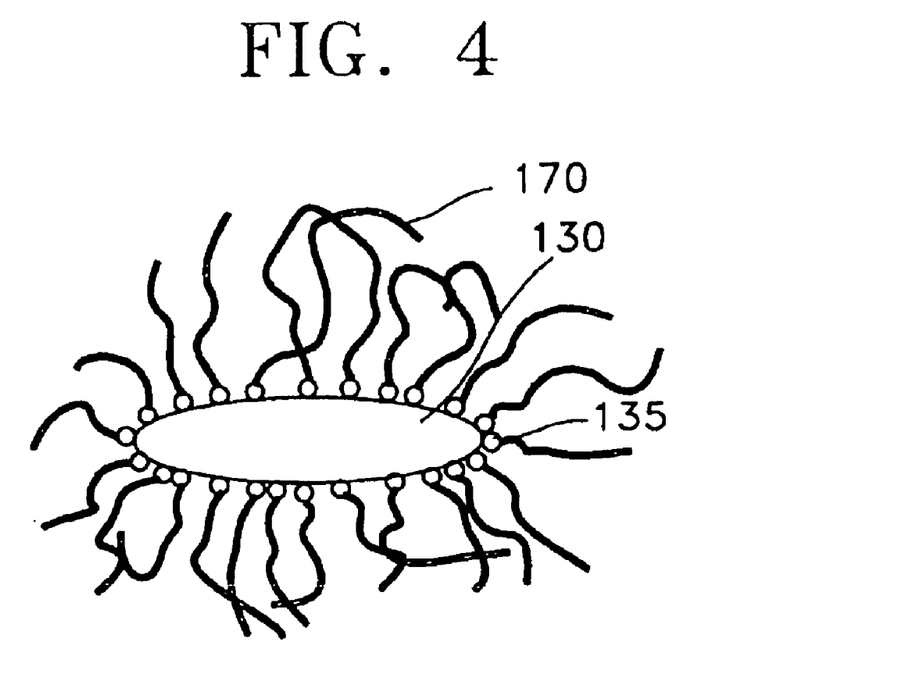
FIGS. 4 and 5 are schematic cross-sectional views illustrating the growth of carbon nanotubes according to the embodiment of the present invention.
Figure 5:
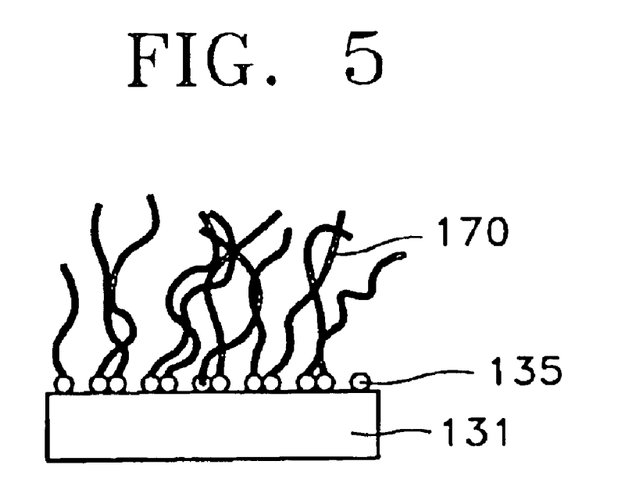

As shown in FIGS. 3 and 4, carbon nanotubes 170 are grown from the catalyst 135 by the reaction of the reactant gas containing a carbon source gas supplied on the catalyst 135 that is locally heated, in step 1300 of FIG. 1. Here, hydrocarbon gas such as methane gas, acetylene gas, propane gas or benzene can be used as the carbon source gas. Alternatively, a reactant gas in which hydrocarbon gas is mixed with hydrogen gas may be used. In addition, an inert gas can be used as a carrier gas.

Figure 7:
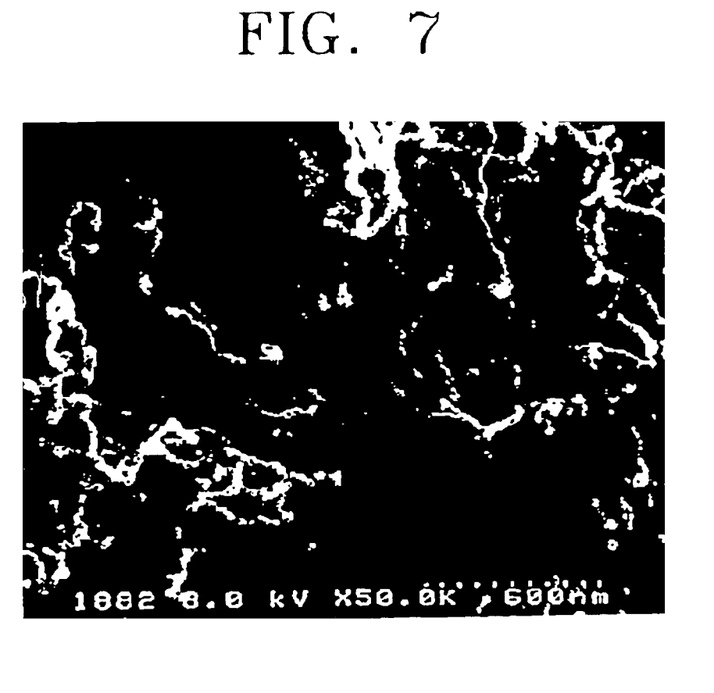
FIGS. 7 through 12 are the scanning electron microscope (SEM) pictures of carbon nanotubes synthesized by a method of synthesizing carbon nanotubes according to the embodiment of the present invention.

The result of synthesizing carbon nanotubes using the catalyst powder 135' of Fe (5 wt %)/C as described above is clearly presented in the scanning electron microscope (SEM) picture of FIG. 7.

As described above, in the case of the catalyst powder 135' of Fe (5 wt %)/C, both the catalyst 135 and the support 130 can be heated. However, when the catalyst 135 is loaded on the support 130 or the substrate 131 formed of a material such as silicon oxide ($SiO_2$) or glass which is not heated by microwaves, only the catalyst 135 can be heated without heating the support 130 or the substrate 131. In this case, hydrogen sulfide ($H_2S$) gas may be injected as a reactant gas together with hydrocarbon gas to grow carbon nanotubes.

TEST EXAMPLE 2

Figure 8:
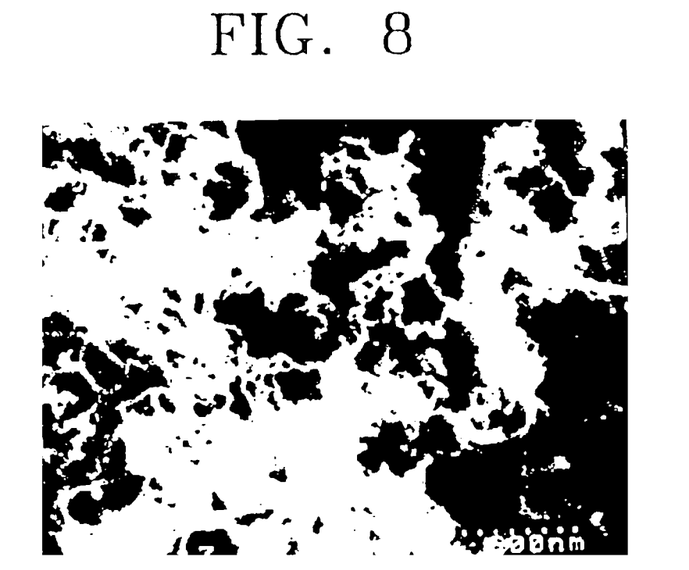

Co of 10 wt % is impregnated into the support 130 of $SiO_2$ by dissolving a Co-precursor such as $Co(NO_3)_3 6H_2O$ in distilled water. The resultant thing is dried at about 110° C. for about 24 hours and then reduced at 500° C., which is obtained by increasing a temperature at a rate of 5° C./min while flowing hydrogen gas, for 3 hours, thereby obtaining the catalyst powder 135' of Co (10 wt %)/$SiO_2$. Thus-made catalyst powder 135' is put on the boat 150 and introduced in the reactor 100. Next, acetylene ($C_2H_2$) gas and hydrogen sulfide ($H_2S$) gas is flown in the reactor 100 at flow rates of 10 ml/min and 3 ml/min to purge the reactor 100. Then, microwaves are irradiated for 30 minutes. The support 130 of $SiO_2$ is not heated by the microwaves, but the Co is heated by the microwaves so that carbon nanotubes are generated. FIG. 8 is a SEM picture showing the generated carbon nanotubes.

Instead of using a transition metal such as iron, cobalt or nickel as a catalyst, a compound containing the transition metal can be used as a catalyst and locally heated by microwaves to synthesize carbon nanotubes. The support 130 can be formed of $SiO_2$ which is not heated by microwaves, and a sulfide of the transition metal can be used to generate carbon nanotubes.

TEST EXAMPLE 3

Figure 9:
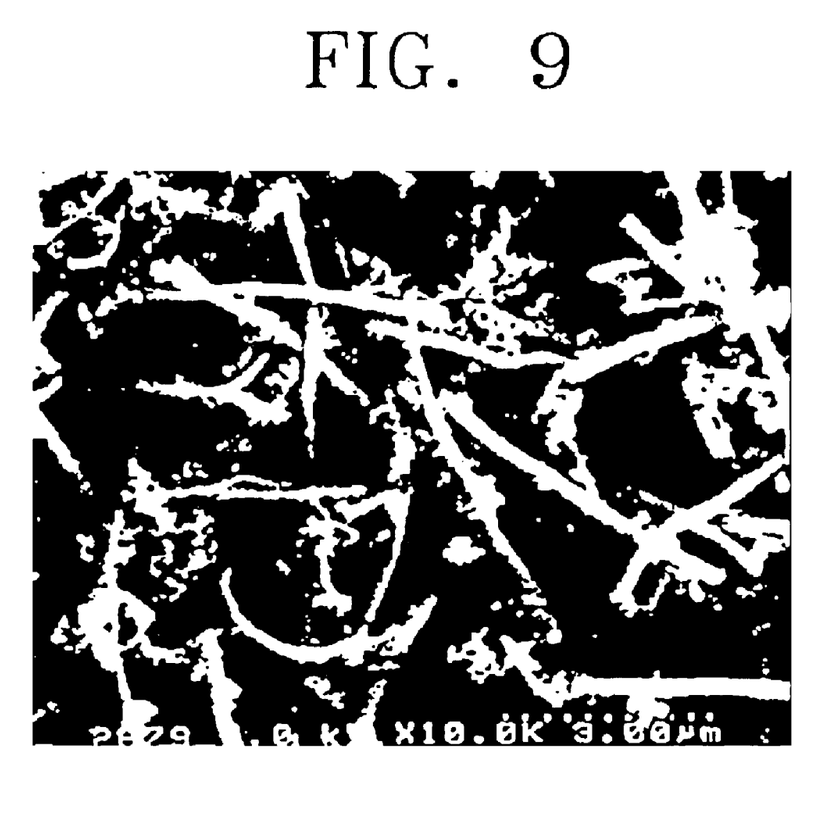

As described above, Co of 10 wt % is impregnated into the support 130 of $SiO_2$ by dissolving $Co(NO_3)_3 6H_2O$ in distilled water. The resultant thing is dried at about 110° C. for about 24 hours. A temperature is increased at a rate of 5° C./min while flowing hydrogen gas over the dried catalyst, and then the catalyst is reduced at 500° C. for 3 hours, thereby obtaining a catalyst of Co (10 wt %)/$SiO_2$. Then, a temperature is increased at a rate of 10° C./min while flowing $H_2S(10\%)/H_2$ gas over the catalyst of Co (10 wt %)/$SiO_2$, and the catalyst of Co (10 wt %)/$SiO_2$ is sulfurized at 400° C. for 2 hours, thereby obtaining a catalyst of Co (10 wt %)$S_x$/$SiO_2$. Thus-made catalyst is put on the boat 150 and introduced in the reactor 100. Next, only acetylene ($C_2H_2$) gas is flown in the reactor 100 at a flow rate of 10 ml/min for 5 minutes for reaction. FIG. 9 is a SEM picture showing carbon nanotubes which has been grown by the reaction.

Meanwhile, also in the case of using plastic to form the support 130, carbon nanotubes can be synthesized by microwave heating.

TEST EXAMPLE 4

Figure 10:
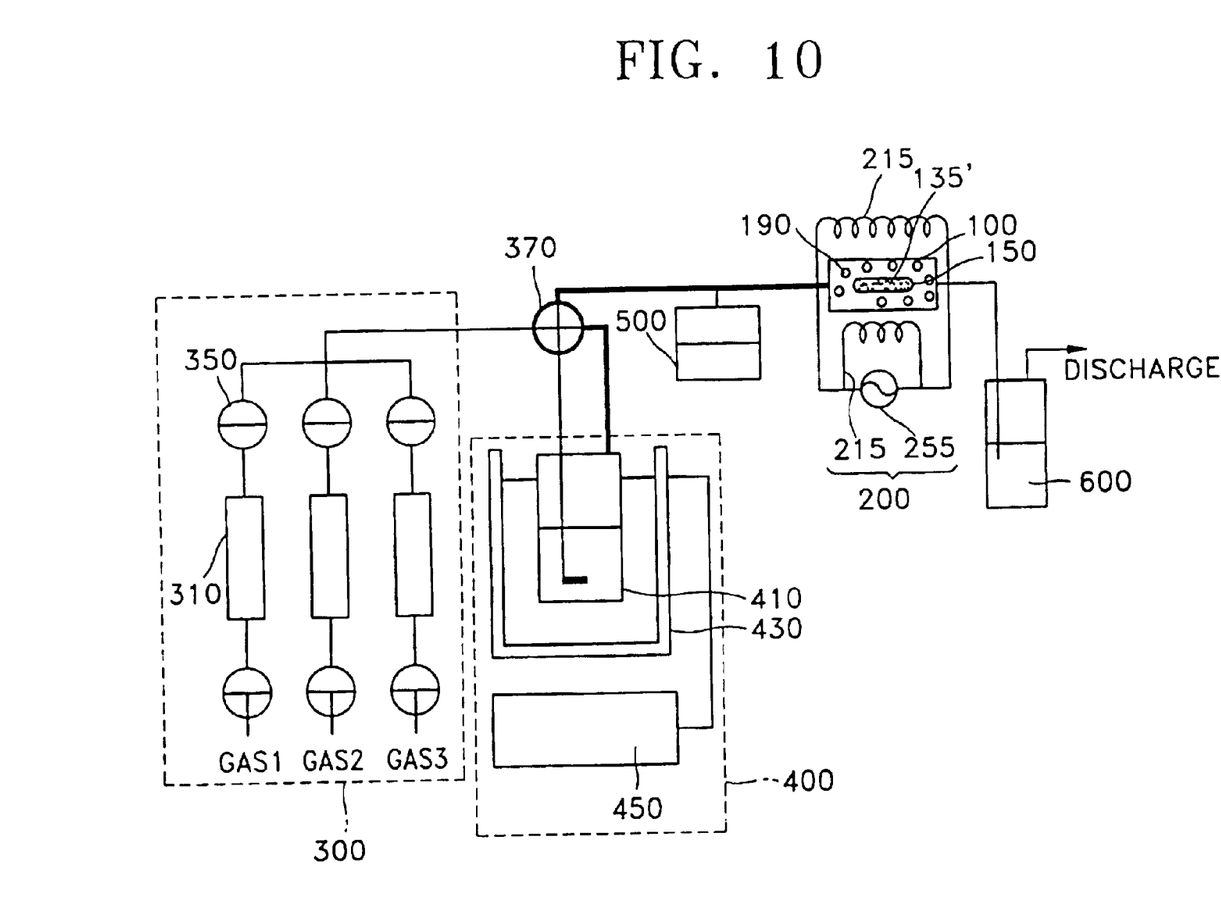

Cobalt black, which is substantially cobalt oxide, is mixed with a nafion solution. The surface of a substrate formed of teflon is painted with the mixed result and dried at 110° C. for a day. The dried substrate surface is sulfurized at 300° C. for 10 hours by flowing a 10 volume % mixed gas of $H_2S$ and $H_2$ over the substrate surface at a flow rate of 30 ml/min, thereby obtaining a catalyst of cobalt sulfide. Thus-made catalyst on the plastic substrate is inserted into the reactor. $C_2H_2$ and $H_2$ is flown in the reactor at a flow rate of 10 ml/min:40 ml/min to purge the reactor, and microwaves are irradiated on the substrate for 30 seconds for the reaction of the catalyst. FIG. 10 is a SEM picture showing carbon nanotubes which has been grown by the reaction.

Also, when a glass substrate instead of a plastic substrate is used as a support, carbon nanotubes can be synthesized.

TEST EXAMPLE 5

Figure 11:
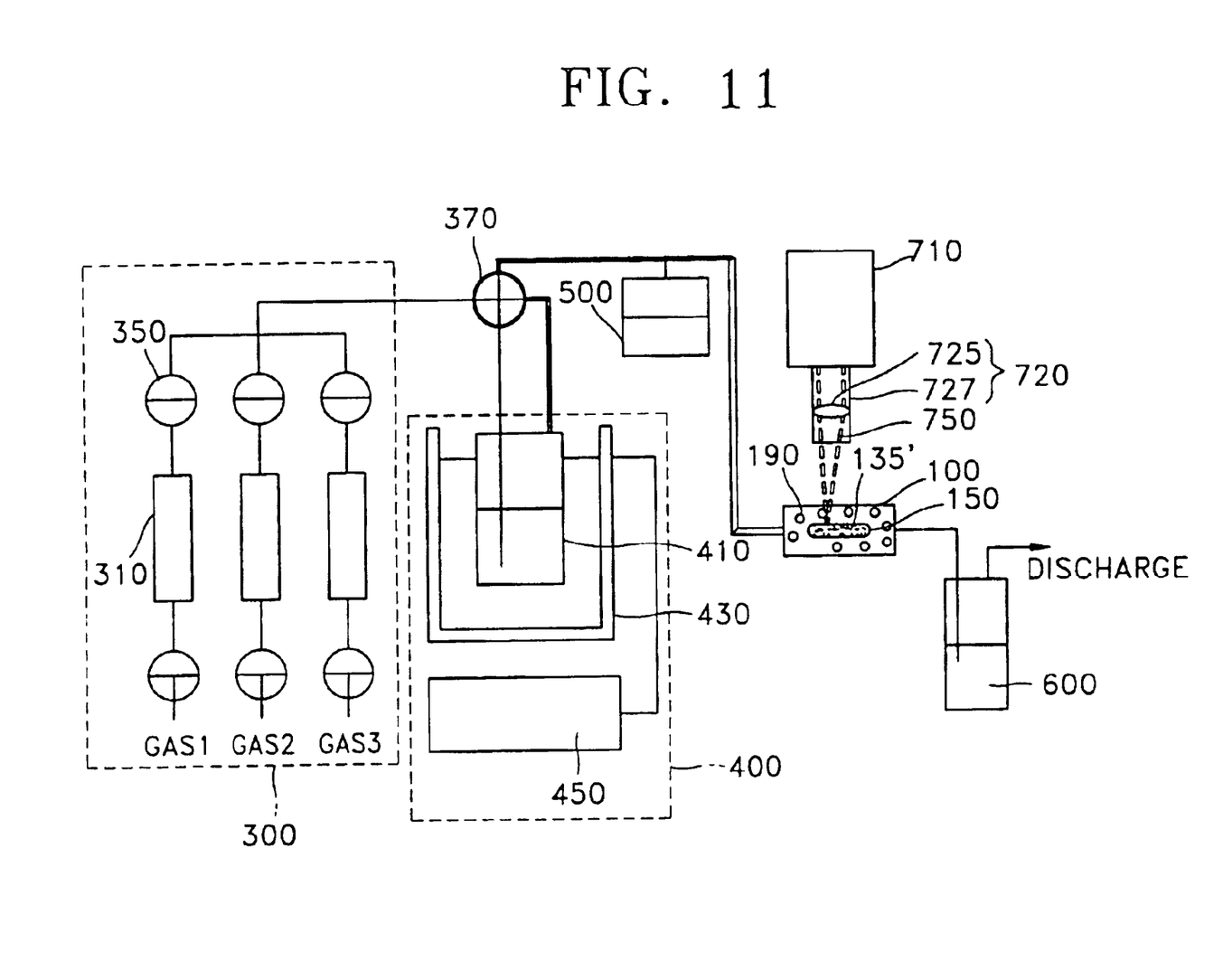
Figure 12:
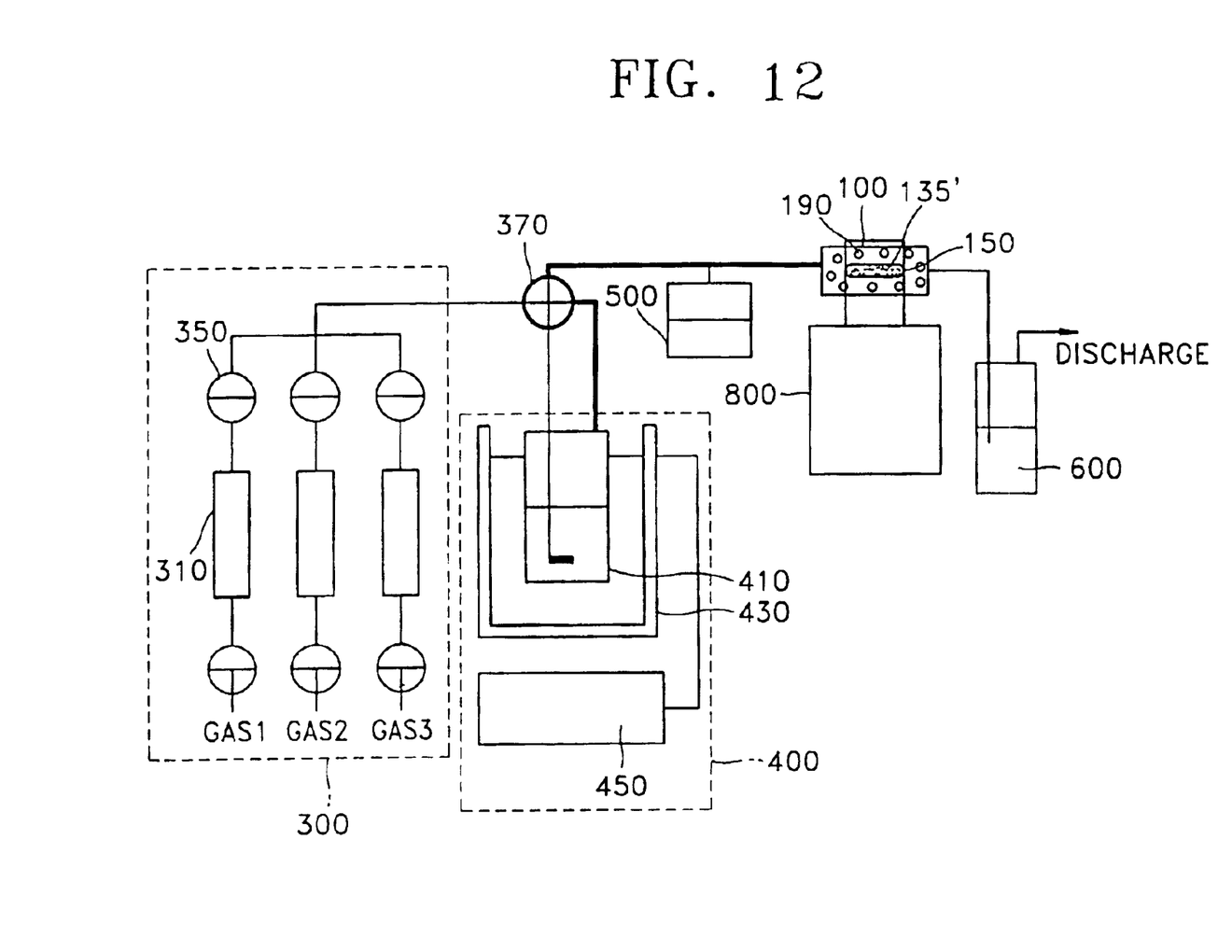

A glass substrate is painted with cobalt naphtenate and dried to load the cobalt naphtenate on the glass substrate as a catalyst. The glass substrate loaded with the cobalt naphtenate, i.e., the catalyst, is inserted into a reactor. Then, $C_2H_2$ and $H_2S$ is flown in the reactor at a flow rate of 10 ml/min:3 ml/min to purge the reactor. Next, microwaves are irradiated on the glass substrate for 9 minutes. Here, the glass substrate is substantially not heated, and only the catalyst is selectively and locally heated, thereby synthesizing carbon nanotubes. FIG. 11 shows a SEM picture of the synthesized carbon nanotubes. Alternatively, $C_2H_2$ and $H_2S$ is diluted with $H_2$ and flowed in the reactor at a flow rate of 10 ml/min:3 ml/min:117 ml/min while microwaves are being irradiated on the substrate for 5 minutes to provoke the reaction of the catalyst with the $C_2H_2$, $H_2S$ and $H_2$ gas so that carbon nanotubes can be synthesized. FIG. 12 shows a SEM picture of thus-synthesized carbon nanotubes.

Meanwhile, in a method of synthesizing carbon nanotubes according to the embodiment of the present invention, a catalyst can be supplied into the reactor 100 in gas phase not in a powder state. For example, a catalyst precursor such as a compound such as ferrocene or iron pentacarbonyl containing metal atoms is vaporized by the saturator 410 of FIG. 6 or the like and supplied into the reactor 100.

In this case, catalyst precursors or catalysts supplied into the reactor 100 are heated by a local heating method, for example, a microwave heating method. The catalysts may float in the reactor 100. Carbon nanotubes can be grown on the floating catalysts by the reaction of hydrocarbon or the like supplied into the reactor 100. By supplying catalysts in gas phase as described above, carbon nanotubes can be synthesized in gas phase. Accordingly, the mass production of carbon nanotubes can be realized.

FIG. 13 is a schematic diagram illustrating an example of a carbon nanotube synthesizing apparatus suitable for an electromagnetic inductive heating method used in the embodiment of the present invention. A carbon nanotube synthesizing apparatus as shown in FIG. 6 is used for irradiating microwaves to realize local heating proposed by the embodiment of the present invention. The local heating can be performed by an electromagnetic inductive heating method. For example, as shown in FIG. 13, a carbon nanotube synthesizing apparatus including a local heater 200' which is configured such that a high-frequency coil 215 is provided around the reactor 100, and the high-frequency coil 215 is connected to a high-frequency power supply 255 can be proposed. High-frequency current applied to the high-frequency coil 215 forms an electromagnetic field around the high-frequency coil 215. Due to a change in the electromagnetic field, the catalyst 135 introduced in the reactor 100 can be selectively heated.

FIG. 14 is a schematic diagram illustrating an example of a carbon nanotube synthesizing apparatus suitable for a laser heating method used in the embodiment of the present invention. The local heating can be performed by a laser heating method as shown in FIG. 14. For example, a laser beam generator 710 is provided near the reactor 100. Laser beams 750 generated by the laser beam generator 710 are focused on a lens 725 held by a lens holder 727 so that the local heating proposed by the embodiment of the present invention can be performed. In this case, the catalyst 135 or the catalyst powder 135' introduced in the reactor 100 can be selectively heated by controlling the focusing of the laser beams 750.

FIG. 15 is a schematic diagram illustrating an example of a carbon nanotube synthesizing apparatus suitable for a radio frequency heating method used in the embodiment of the present invention. The local heating can be performed by a radio frequency heating method as shown in FIG. 15. For example, a RF generator 800 is provided near the reactor 100. The local heating of the embodiment of the present invention can be performed using RF generated by the RF generator 800. By using the RF, the catalyst 135 in gas phase or the catalyst powder 135' can be selectively heated.

The present invention described above improves a conventional method of synthesizing carbon nanotubes at a high temperature range by heating an entire reactor. According to the present invention, carbon nanotubes can be synthesized even an entire reactor is maintained at a lower temperature. Even if the temperature of the entire reactor is maintained low, a temperature required for synthesizing carbon nanotubes can be obtained by a local heating method for selectively heating a catalyst. Accordingly, a substrate or a support formed of glass or polymer material such as plastic which cannot be used under the condition of a high temperature can be used.

Although the invention has been described with reference to a particular embodiment, it will be apparent to one of ordinary skill in the art that modifications to the described embodiment may be made without departing from the spirit and scope of the invention.

What is claimed is:

1. A method of synthesizing carbon nanotubes, comprising the steps of:

introducing a catalyst in a reactor on a support structure that is not tolerant of a reaction temperature of the catalyst;

supplying a reactant gas containing a carbon source gas over the catalyst;

selectively and locally heating the catalyst in the reactor, without necessarily heating anything else, to the reaction catalyst temperature; and growing carbon nanotubes from the heated catalyst.

2. The method of claim 1, wherein the catalyst is formed of a transition metal such as iron, nickel or cobalt; metal sulfide, metal carbide, metal oxide or metal salt of the transition metal; or an organic compound containing the transition metal.

3. The method of claim 1, wherein the catalyst is loaded on a support by an impregnation method, an incipient wetness method or an ion-exchange method and is supplied into the reactor in a powder state.

4. The method of claim 1, wherein the catalyst is loaded on a substrate by a deposition method, a painting method and a spray method to be supplied into the reactor.

5. The method of claim 1, wherein for the catalyst, a metal precursor is loaded on a substrate or a support and changed into a metal phase through reduction, calcination, sulfiding or carbonization, and the metal catalyst is supplied into the reactor.

6. The method of claim 1, wherein for the catalyst, metal sulfide obtained by sulfiding a metal precursor with hydrogen sulfide is used.

7. The method of claim 1, wherein the catalyst is supplied into the reactor in the form of a catalyst precursor in gas phase.

8. The method of claim 7, wherein the catalyst precursor is ferrocene or iron pentacarbonyl.

9. The method of claim 1, wherein the carbon source gas contains one selected from the group consisting of acetylene, methane, propane and benzene.

10. The method of claim 1, wherein the reactant gas further comprises hydrogen gas or inert gas.

11. The method of claim 1, wherein the reactant gas further comprises hydrogen sulfide ($H_2S$) gas.

* * * * *